July 2, 1963  C. H. ANNISS ETAL  3,095,589
MACHINES FOR APPLYING PRESSURE TO SHOE BOTTOMS
Filed Dec. 19, 1961  12 Sheets-Sheet 1

Inventors
Charles H. Anniss
Thomas A. Kestell
Ernest Tipper
By their Attorney
Edward W. Fearing July 2, 1963  C. H. ANNISS ETAL  3,095,589
MACHINES FOR APPLYING PRESSURE TO SHOE BOTTOMS
Filed Dec. 19, 1961  12 Sheets-Sheet 2

United States Patent Office 3,095,589
Patented July 2, 1963

3,095,589
MACHINES FOR APPLYING PRESSURE TO
SHOE BOTTOMS
Charles H. Anniss, Thomas Aubrey Kestell, and Ernest
Tipper, Leicester, England, assignors to United Shoe
Machinery Corporation, Flemington, N.J., a corporation of New Jersey
Filed Dec. 19, 1961, Ser. No. 160,483
Claims priority, application Great Britain Jan. 7, 1961
15 Claims. (Cl. 12—33)

This invention relates to improvements in pressure applying machines suitable for use in attaching shoe soles.

The machine is of the general type provided with mechanisms for automatically clamping a breast flap to the heel of a shoe and for simultaneously attaching the forepart of a sole to the shoe bottom. Two stations are provided, each with a pair of shoe pressing members comprising a compressible pad and an abutment mounted on a pressure head, between which pad and abutment a shoe is gripped and subjected to a sole attaching pressure.

The usual practice is for an operator to present a shoe to the machine by placing it upon the pad and while holding the shoe steady in an upright position the operator initiates a predetermined cycle of operation, first to raise the pad and shoe thereon until the shoe engages the abutment. Thereafter, as pressure is applied to grip the shoe the operator removes his hand from the shoe while the cycle is being completed and the shoe is released for convenient removal from the machine.

In order to give an operator as much freedom as possible in presenting a shoe to the machine the pad and abutments are separated by a relatively wide gap when the machine is at rest. Before a shoe may be gripped by the pressing members it must be moved a distance sufficient to close up the gap between the pressing members and to bring the shoe into contact with the abutments. During the interval between the gap closing movement of the shoe and pad and the application of pressure to the shoe there is a likelihood that the operator's hand while it holds the shoe steady may be pinched between the shoe and the pad.

One of the objects of the present invention is to provide a simple and conveniently arranged shoe pressure applying machine suitable in all respects for use in the attachment of soles to shoes, wherein the danger of subjecting the operator's hands to possibility of injury is minimized. An important feature of the invention in this respect is to provide an improved safety control in such machine for slowing down the speed with which the pressure applying members close up the gap between them just before a shoe is gripped and for halting the cycle of machine operation at a stage just before the sole attaching pressure is exerted on the shoe, so that the operator's hand's will not be subject to dangerous impact before they may be removed from the shoe.

As is usual for this type of machine a shoe supporting pad is mounted in a carrier, in the form of a pad box supported on a ram consisting of a cylinder slidably mounted on a stationary piston. The cylinder is capable of being moved from an inoperative to an operative position by means of oil pumped from a sump in a hydraulic system, initiation of each cycle of the machine being accomplished through treadle actuated mechanism including a spool valve and a nonreturn valve to prevent oil passing through the spool valve into the cylinder from returning and, thus to avoid a separation of the pressing members before the hydraulic cycle is completed.

As hereinafter described, oil chambers are provided on either side of the piston associated with the ram, so that oil filling one of the chambers to raise the ram causes oil to escape from the other chamber and the spool valve connects the nonreturn valve and a check valve in a manner to restrict escape of oil from the escape chamber, thus reducing the speed at which the ram is raised, the elevation of the ram being halted temporarily by closure of the check valve. In this way complete safety control is exercised over the hydraulic system with the result that a very smooth and reliable operation is afforded.

These and other features of the invention, as hereinafter described and claimed, will readily be apparent to those skilled in the art from the following detailed specification taken in connection with the accompanying drawings, in which:

Figure 1:
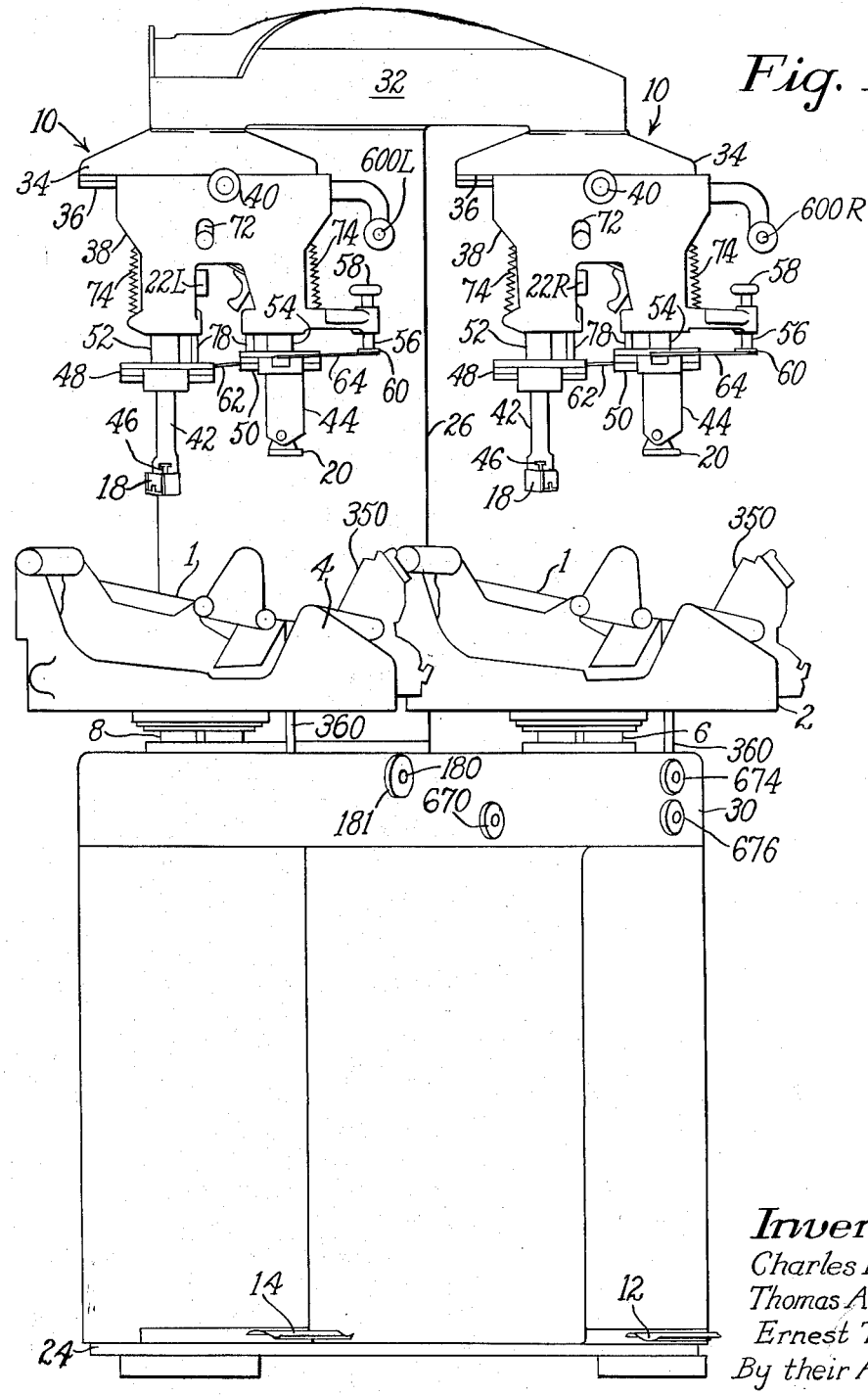
FIG. 1 is a general view taken in elevation at an angle somewhat to the left of the machine embodying features of the present invention.

The illustrated machine is provided with two operating stations, so that a shoe may be held under pressure between a pair of pressure applying members for a convenient period of time at one of the stations while the operator of the machine places a shoe under pressure at the other station. For supporting a shoe on a last to which a sole has been spotted there is provided at each station pressure applying members comprising a pad 1, in a box 2 of convenient construction arranged to accommodate the bottom of a shoe being operated upon. The box 2 is mounted on a ram co-operating with a pressure head, there being a similar pad 1 in a box 4, a ram and a pressure head associated with the other operating station. To facilitate application of a shoe to either station each pad box and its pressure head are separated to form a relatively wide gap while the pressure members are idle.

To form the separating gaps the pad boxes 2 and 4 are respectively mounted on the upper ends of hydraulic rams 6 and 8. For convenience in introducing shoes into the separating gaps of the stations, the pad boxes are mounted obliquely to the front of the machine with their shoe forepart receiving end extending rearwardly. The machine has a hydraulic system actuated through a predetermined operating cycle for raising the rams and closing the gaps between the pressure members independently of each other to carry shoes which are supported by either of the pad boxes into applying engagement with the pressure heads, generally referred to by the numeral 10, there being a pressure head 10 associated with each operating station.

To control the rise of each of the rams 6 and 8 and to start the hydraulic system in its operating cycle, manually actuated means are provided, including a treadle 12 arranged when depressed to cause the ram 6 to be raised and a treadle 14 arranged when depressed to cause the ram 8 to be raised. When a shoe is introduced into the gap above the pad box 2 and supported on the pad therein, a pump 15 (see FIG. 6) associated with the hydraulic system forces oil from a sump 16 through a pipe 17 at the bottom of the machine through the hydraulic system, the ram 6 being raised upon depression of the treadle 12 to carry the shoe into engagement with yieldable abutments 18 and 20 mounted on the corresponding pressure head 10.

The ram 6 is raised quickly until the shoe supported thereon engages the corresponding abutments 18 and 20, upward yielding movement of which actuates a normally closed microswitch 22R (FIG. 2) in an electrical circuit to be described. Opening of the microswitch 22R causes the ram 6 to continue to rise at a lower speed than before until the resistance to elevation of the ram is sufficient to stop it. In the stopped position of the ram the hydraulic cycle is halted with the shoe gripped between the pad box 2 and the corresponding pressure head including abutments 18 and 20. The operator may then have an opportunity to satisfy himself that the shoe is correctly positioned in the machine. If it should not be properly positioned the treadle is released to cause the ram to descend to an inoperative position where the shoe is free to be removed or readjusted in its position. Having ascertained that the shoe is correctly positioned the operator may press one of two hand actuated safety controls 600R and 600L (FIG. 1) positioned one at each station of the machine. Pressing of the hand control 600R causes an increase in the pressure with which the shoe is gripped by the ram 6 against the abutments 18 and 20 and an initiation of the operation of a timing mechanism automatically to cause the ram 6 to descend to its inoperative position after a convenient "dwell" period during which the shoe remains under increased pressure. Having pressed the hand control 600R the operator may release the treadle 12, the shoe supported by the ram 6 remaining under pressure until the end of the "dwell" period. The operator may then proceed to apply a new shoe to the pad box 4 at the other operating station in the machine.

Depression of the treadle 14 is arranged to cause the ram 8 supporting the pad box 4 to be raised, carrying the shoe into operative position with the corresponding pressure head including abutments 18 and 20, in a manner similar to that outlined in connection with the ram 6, enabling the corresponding normally open switch 22L to open. The appropriate hand actuated control 600R or L may be pressed to cause the shoe first to be gripped under reduced pressure and then to have increased pressure applied to it with an initiation of operation for the timing mechanism associated with the ram 8.

The construction and arrangement of the machine is such that prior to actuation of the hand control 600R or L for increasing the pressure on a shoe the reduced pressure for initially gripping the shoe is low enough to prevent likelihood of injury to the operator should one of his hands become trapped between the shoe and the pressure head 10. If the operator fails to actuate the control 600R or L the hydraulic cycle of the machine is halted indefinitely.

The frame of the machine includes a base 24 and a column 26, supported on a rearward portion of a table 30 connected by suitable frame construction extending to the base. Supported at the upper end of the column 26 and extending forwardly therefrom is a head casting 32. The two pressure heads 10 depend from the head casting and each head comprises a support 34 secured to the head casting, an inverted T-shaped guide member 36 mounted on a flat undersurface of the support 34 and a carrier 38 for the abutments 18 and 20 slidably mounted on the guide member 36. To lock the carrier 38 in adjusted position on the guide member 36, the carrier 38 has threaded into it a locking screw 40 which may be tightened or released to enable change in the position of the abutments as a unit. Each abutment 18 is arranged to engage a shoe along the toe, the abutments 20 being arranged to engage the upper part of a last projecting from the shoe above the heel.

Each pressure head 10 is similar in construction and the abutments 18 are covered with compressible material to prevent damage to the shoe upper. Each abutment 20 comprises a metallic plate for engagement with the top of the last. The abutments 18 and 20 are supported on the lower ends of downwardly extending legs 42 and 44, the abutments 20 being pivotally mounted to swing about a horizontal axis on the leg 44 and capable of yielding to accommodate themselves to the top of the shoe heel. To accommodate each shoe being operated upon, each abutment 18 may be adjusted and locked in position along a horizontal slideway 46 in the lower end of the leg 42. In order to accommodate lasts of different contours the positions of the abutments 18 and 20 relatively to each other in a heightwise direction may be changed by interposing spacing blocks of suitable dimensions between the leg 42 and the abutment 18, each spacing block being provided with a tongue portion engaged in the slideway 46 and a slideway at its lower end to fit the upper end of the abutment.

To fit lasts of different sizes and styles the legs 42 and 44 are adjustably mounted for movement toward and away from each other on slides 48 and 50 formed on the lower ends of shafts 52 and 54, the shafts being slidably mounted in vertical bores formed in each carrier 38. Each carrier 38 also is formed with a vertical opening through which passes loosely a spindle 56 carrying an adjusting knob 58 at its upper end. At its lower end each spindle has secured to it the midpoint of an arm 60, opposite ends of which are connected by links 62 and 64 to the upper end of the legs 42 and 44, respectively. Rotation of the spindle acts to swing the arm and through the links 62 and 64 to move the legs 42 and 44 toward and away from each other along the slides 48 and 50. The links 62 and 64 are pivotally connected to the legs 42 and 44 and the spindle 56 is of sufficient length to enable free heightwise movement of the abutments 18 and 20 relatively to the carrier 38 on which they are mounted, as well as to each other.

Figure 2:
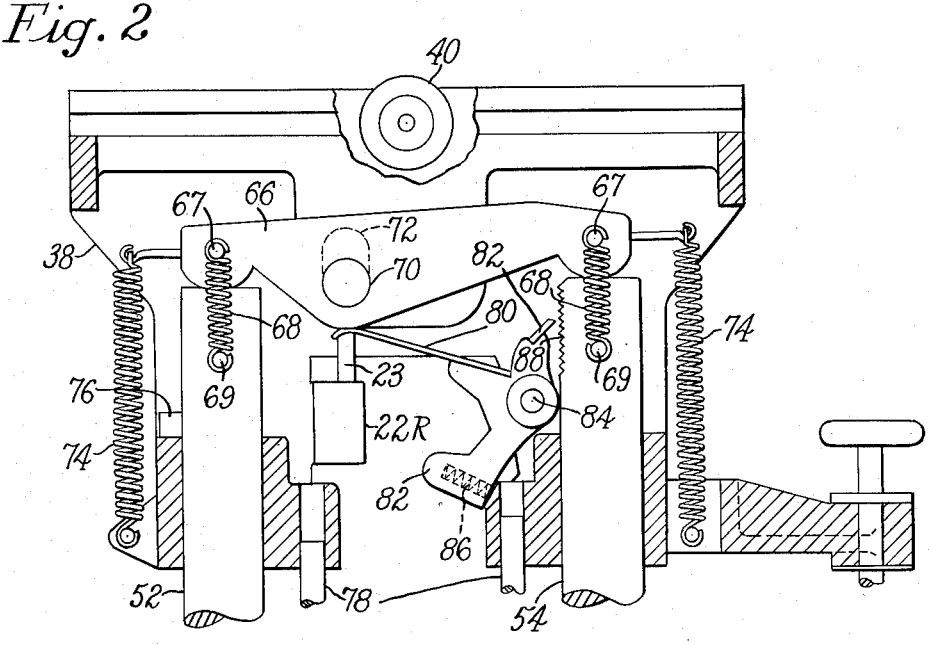
FIG. 2 is a detail view partly in section and on an enlarged scale of one of a pair of pressure heads in the machine of FIG. 1.

To enable the forces applied to the abutments 18 and 20 to be distributed properly, the carrier 38 has mounted in it a load balancing lever 66 bridging the upper ends of the shafts 52 and 54, as best shown in FIG. 2. The balancing lever 66 has secured in it a pivot pin 70, the ends of which normally rest against the bottoms of vertical slots 72 in the carrier at either side of the lever 66. To hold the lever in contact with the ends of the shafts 52 and 54, the ends of the lever 66 have secured in them a pair of pins 67 between which and a set of pins 69 are stretched four springs 68. To urge the pivot pin for the balancing lever against the bottom of each slot 72 two springs 74 are anchored between the ends of each lever 66 and the carrier 38, the ends of the balancing lever causing the shafts 52 and 54 to be moved downwardly to a limit determined by engagement of a stop pin 76 with a lug formed in the bore of the carrier for shaft 52.

In operation of the machine, as one of the pad boxes is raised to bring a shoe thereon into engagement with the abutments 18 and 20, the shoe is first engaged at the toe by the abutment 18. The abutments 18 and 20 may conveniently be positioned to correspond in relation to the angular orientation of the pad box about a heightwise axis. As the shoe continues to move upwardly the abutment 18 and shaft 52 yield causing the lever 66 to rotate on its pivot pin 70 until the abutment 20 on the shaft 54 engages the top of the last.

After the shoe carried by a ram has been engaged with its abutment, according to the invention, a set of safety controls comes into operation to reduce the pressure of the shoe against the abutments and to halt the cycle of operation if necessary, until it is ascertained that it is safe to continue the cycle. However, if an operator is satisfied that no difficulty is likely he may actuate the hand control ahead of time to avoid halting the cycle. Also, in case the machine operator should have either of his hands trapped between the shoe and the abutments at this stage of operation, it is unlikely that injury would occur as either of the abutments and their mountings may yield, the lever 66 being capable of being raised by reason of upward movement of the pin 70 in the slot 72. As a further factor of safety it will be remembered that upon release of the treadle at this stage of operation the ram immediately descends. After engagement of the last on which a shoe is mounted with the abutment 20 further upward movement of the shoe causes both abutments and their associated shafts 52 and 54 to yield upwardly, the lever 66 being raised as its pivot pin 70 moves upwardly in the slot 72. To prevent rotation of the shafts 52 and 54 the slides 48 and 50 have projecting upwardly from them a pair of pins 78 slidably engaging openings in the carriers 38.

In the lowermost position of the lever 66 the lower face of the lever presses against a plunger 23 (FIG. 2) of the microswitch 22R or 22L. Upon upward movement of the lever the microswitch 22R or 22L opens a circuit and causes the ram, which up to this point in the operating cycle has been raised comparatively quickly, to continue to rise at a considerably slower speed.

In the lowermost position of the lever 66 it presses on an arm 80 of a pawl 82 pivotally mounted on a pin 84 in the carrier 38, holding the pawl in an inoperative position. As the lever 66 moves upwardly a compression spring 86 acting between the pawl and a surface on the carrier 38 urges the pawl into engagement with ratchet teeth 88 on the shaft 54. The teeth 88 are so formed that when engaged by the pawl they prevent further downward movement of the shaft 54 under pressure from the lever 66. The pawl 82, however, does not prevent the shaft from yielding upwardly further, the pawl riding idly over the teeth 88. Thus, the danger that pressure of the shoe on the abutment 18 will impart a swinging movement to the lever 66 such as will urge the shaft and its abutment downwardly as minimized. When the upward movement of the ram is halted and the operator is satisfied with the position in which the shoe is gripped between the ram and the pressure head, he may actuate the hand control 600R or L to initiate operation of the timing mechanism and to increase the pressure applied to the shoe. The lever 66 is then released to its uppermost position by the shafts 52 and 54 with the pivot pin 70 in engagement with the upper end of the slots 72. The shafts 52 and 54 engaging the lever 66 are spaced at distances from the pin 70 to distribute the pressure along the shoe with the greatest pressure exerted on the toe.

The rams 6 and 8 are mounted for heightwise movement in the table 30 and since both rams are similarly constructed only the ram 6 and its operation will be described in further detail. The ram 6 is in the form of a cylinder having a closed upper end, on which is mounted the pad box. The ram 6 moves relatively to a stationary piston 90, best shown in FIG. 4. The piston 90 fits within a bore of the ram 6 and is made fast to the upper end of a hollow piston rod 92 secured at its lower end in a cylindrical casing 94 made fast by bolts 95 passing loosely through flanges in the casing and into threaded engagement with the under side of the table 30. The piston 90 is clamped against the upper end of a vertical sleeve 96 through which the piston rod 92 passes, the lower end of the sleeve abutting against an upper face on a shoulder on the piston rod. For securing the parts in place the upper end of the piston rod has threaded on it a nut 97 acting against the upper end of the piston 90. At the lower end of the ram 6 there is an end cap 98 having a bore through which the sleeve 96 slides and between the sleeve 96 and the outer wall of the ram is an oil chamber 100. The sleeve 96 has between its inner diameter and the piston rod 92 an annular space 101 communicating with the oil chamber 100 through ports 102 at the upper end of the sleeve.

To raise the ram, oil is pumped through a conduit 104 through a fixture 105 at the lower end of the piston rod 92 into an oil filled chamber 106 between the closed upper end of the ram 6 and the top of the piston 90. The oil contained in the oil filled chamber 106 presses the ram upwardly and causes oil contained in the chamber 100 to escape through the ports 102, annular space 101, ports 110 and an annular channel 112 in an enlarged lower end of the sleeve 96, oil seals being provided to minimize leakage between the various parts. From the annular channel 112 the escaping oil flows through a conduit 108 (see also FIGS. 5 and 7). From the conduit 108 the oil is carried through an annular channel 220 into a passageway 218 from which it eventually is returned without substantial restriction to the sump 16.

Figure 4:
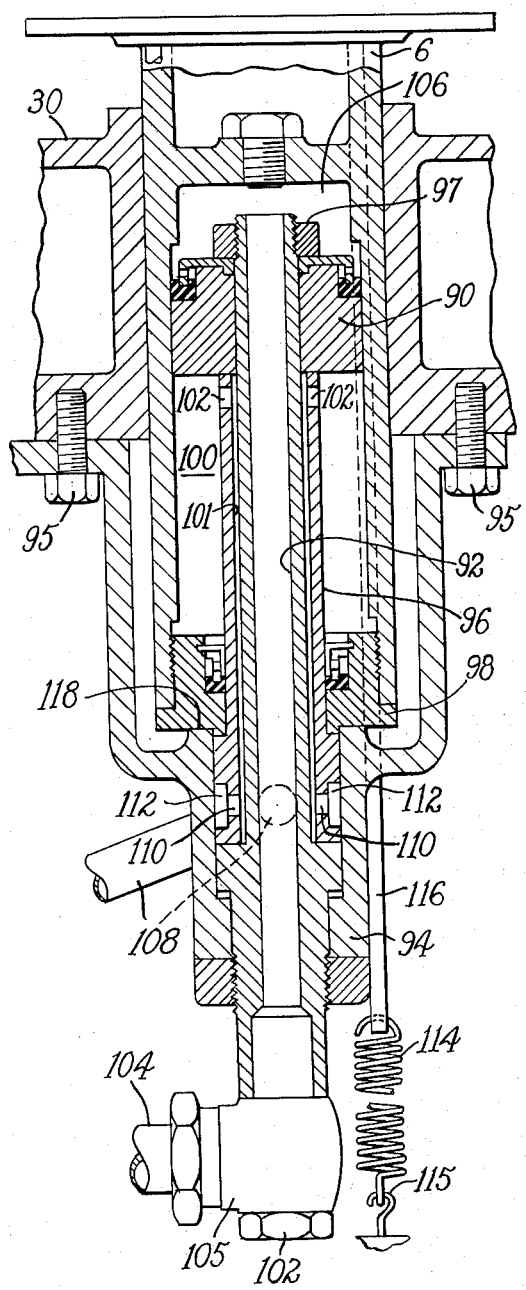
FIG. 4 is a vertical sectional view of one of a pair of hydraulically operated rams in the machine.
Figure 6:
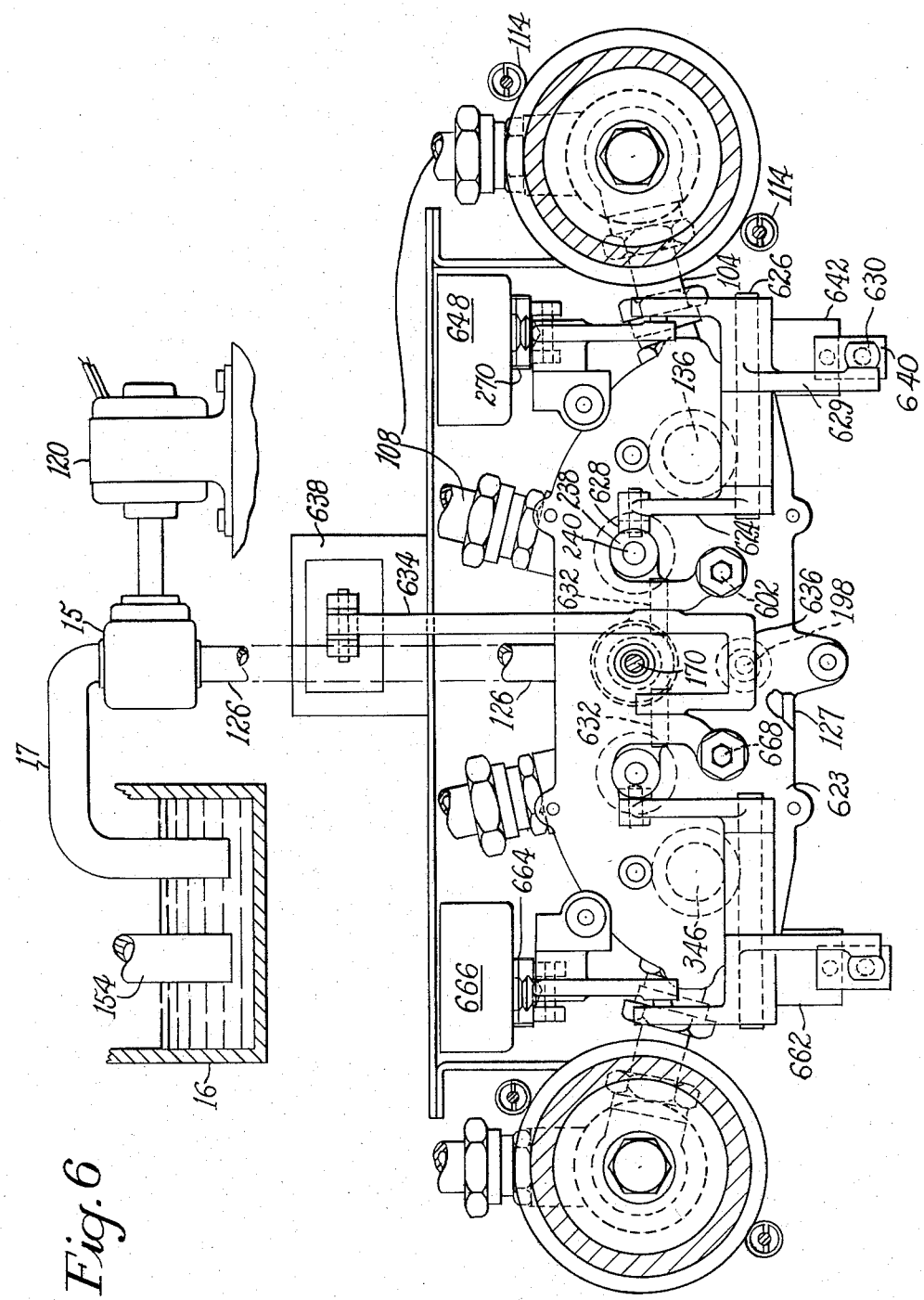
FIG. 6 is a plan view partly in section of the rams and the valve mechanism.

To cause the ram to descend oil pressure in the chamber 106 is vented through a nonreturn valve arranged to prevent relief of pressure from the oil filled chamber, when the cycle of operation is temporarily halted, as hereinafter described, the ram being urged downwardly by springs 114 stretched between hooks 115 in the base of the machine and the lower ends of downwardly extending rods 116 fixed in an outwardly extending flange at the upper closed end of the ram (see FIGS. 4 and 6). The rods 116 project downwardly through openings in the table 30 and prevent rotation of the ram in the table. The ram is urged downwardly until the end cap 98 engages an inner face 118 on the cylindrical casing 94, oil in the chamber 106 being permitted to escape through the piston rod 92 and the conduit 104.

The hydraulic system for supplying oil under pressure to the rams 6 and 8 includes the pump 15 which is driven by an electric motor 120 (see FIG. 6), mounted in the base of the machine. The pump 15 draws oil from the sump 16 through the pipe 17 and forces it into a valve block 127 mounted on the base 24 of the machine, the valve containing pressure control and supply return valves.

Figure 5:
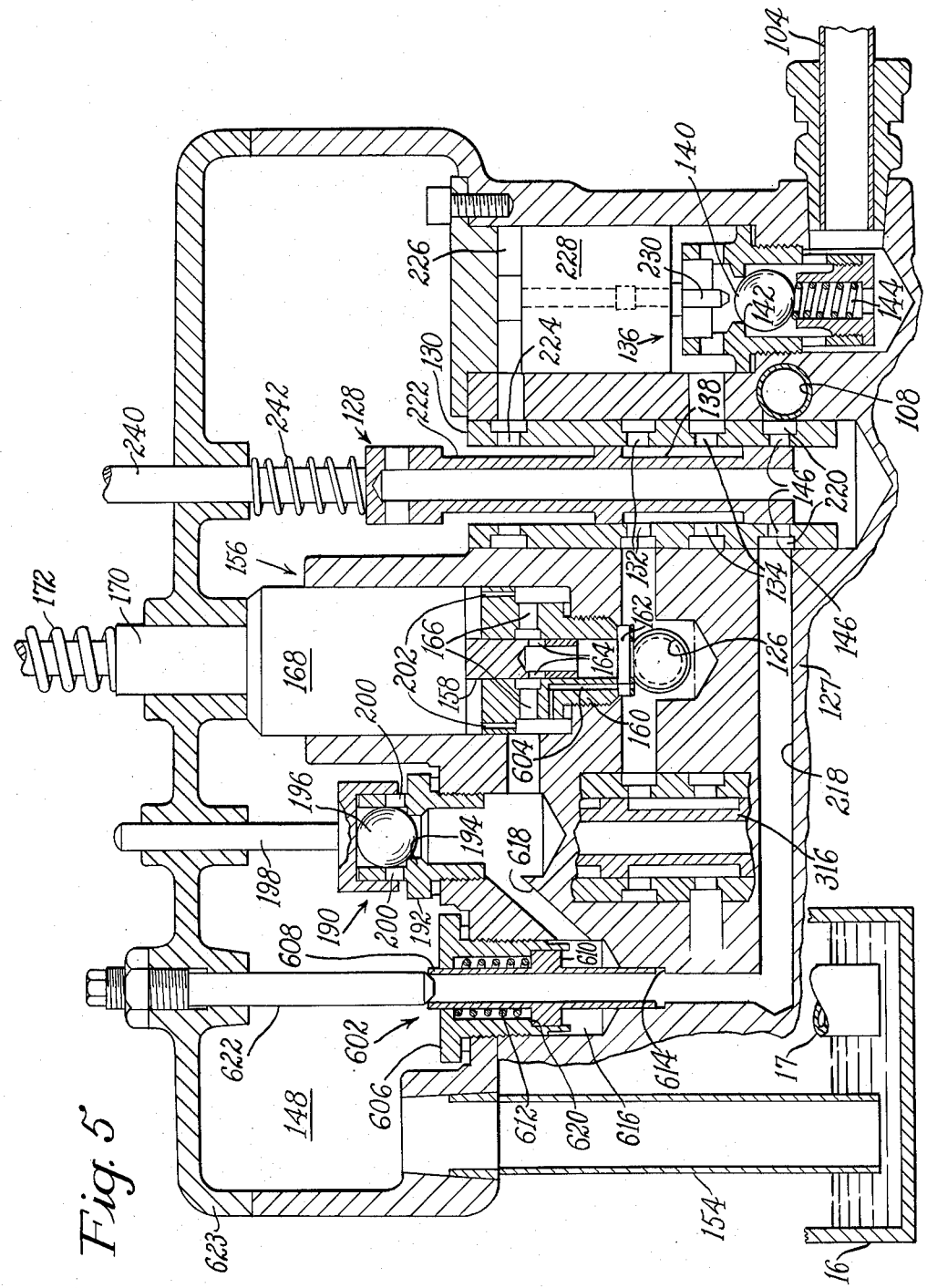
FIG. 5 is a schematic and sectional view on an enlarged scale of valve mechanism contained in a hydraulic system of the machine.

Referring now to FIG. 5, which shows in schematic form some of the valves in the block 127, downward movement of the treadle 12 causes a spool valve 128 to be raised in a cylinder 130 from a lowered closed position to an open position as shown, connecting ports 132 and 134 for communication. When the valve is in this open position oil is caused to flow through a conduit 126 running from the pump 15 to a passage running from the nonreturn valve, indicated at 136, in the block 127. The nonreturn valve comprises a part of the safety controls, in that it holds a shoe in engagement with its abutment without permitting increase of pressure on the abutments.

The spool valve 128 has a portion 138 of reduced diameter. When the spool valve is in its open position oil is caused to flow from the conduit 126 through ports 132 and 134 through the nonreturn valve 136 and the conduit 104. The valve 136 includes a ball 140 which may be unseated by the pressure of the oil to permit the passage of oil into the conduit 104, thus raising the ram. The ball 140 is yieldingly held against a seat 142 by a spring 144 to prevent escape of oil from the ram when the cycle of operations is halted.

As the ram 6 is raised by pressure the oil fills the chamber 106, the escape chamber 100 being exhausted through the conduit 108, the channel 220 in the cylinder 130, passageway 218 and a hydraulically actuated safety control check valve 602 into an upper compartment 148 of the valve block 127, pressure relief being prevented by the non-return valve 136. Oil entering the compartment 148 drains into the sump 16 through a return pipe 154.

Incorporated in the hydraulic system is a high pressure relief valve 156 which may be adjusted to vary the maximum pressure exerted by the ram. The system is constructed to exert maximum pressures in a range of pressure controllable between 2,000 pounds per square inch and 5,000 pounds per square inch, so that by setting the high pressure relief valve to open at 700 pounds per square inch a sole attaching pressure of 5,000 pounds per square inch may be exerted on the bottom of a shoe in the machine.

The high pressure relief valve 156 comprises a cylindrical slide member 158 having a blind axial bore open at its lower end to receive oil under pressure from the conduit 126. The slide member 158 is mounted in a vertical bore of a plug 160 threaded into the valve block 127. When the machine is idle the slide member 158 drops into engagement with a stop pin 162 fixed in the plug 160 across its vertical bore. The slide member 158 has peripheral ports 164 communicating with the axial bore and positioned to be closed by the vertical bore walls of the plug 160 when the machine is idle with the slide member 158 in its lowermost position. When the machine is started in operation oil under a predetermined maximum pressure may raise the slide member 158 against the resistance offered by a piston 168 resting on the slide member 158. Raising the slide member 158 then moves the ports 164 into alinement with ports 166 in the plug 160, thus admitting oil to the axial bore in the slide member 158, through ports 164 and ports 166 through a relief valve into the upper compartment 148 of the valve block 127, as will be described.

The piston 168 is vertically slidable in an enlarged bore in the valve block 127 co-axial with the bore in the plug 160 in which the slide member 158 is mounted. An upper end of the piston is engaged by the lower end of a co-axial rod 170 mounted for sliding movement in the block 127. Surrounding the rod 170 is a compression spring 172 resting on an enlarged head on the rod 170. At its upper end the rod 170 engages an axial passage in a cylindrical member 174 (see FIG. 7). The cylindrical member 174 is threaded on its outer surface and screwed into an internally threaded cap 176 secured in the table 30. The downward force of the spring against the head of the rod 170 may be varied by turning the cylindrical member 174 to control the force required to open the relief valve 156.

For ease of adjustment in tension of the spring 172 the cylindrical member 174 has helical teeth 178 engaged by corresponding teeth on a horizontal shaft 180 rotatable in bearings in the table 30. At the forward end of the shaft outside the table 30 is a handle 181 for the convenience of the machine operator in rotating the shaft.

To provide a visual indication while adjusting the tension of the spring 172 there is pivotally mounted on a pin 173 (FIG. 7) supported by the table 30 a lever 182 having a pin 184 at one end engaged by a lower face on the cylindrical member 174. At the other end of the lever 182 is a pin 186 adapted to be engaged by the lower end of a suitably calibrated scale plunger 188 mounted for heightwise movement in the table 30. Adjustment of the member 174 to increase or decrease the resistance of the spring 172 causes the lever 182 to raise or lower the scale plunger 188 relatively to a top surface of the table, the scale providing a convenient indicator according to the work being operated upon.

To control the pressure exerted on the ram 6 prior to actuation of the hand control 600R there is provided a reduced pressure relief valve 190, shown in FIG. 5. When the treadle 12 is depressed to start elevation of the ram 6 the spool valve 128 is raised to its open position of FIG. 5 and the reduced pressure valve 190 is rendered effective to control the pressure on the ram. The hydraulic system enables oil escaping through the high pressure relief valve 156 to pass through the reduced pressure valve 190 into the upper compartment 148 of the valve block and to drain into the sump 16 through the return pipe 154.

The reduced pressure relief valve 190 comprises a hollow plug 192 screwed into the valve block to provide a valve seat 194 against which a ball 196 is urged. The reduced pressure relief valve 190 is held closed by a vertical rod 198 having an enlarged cup shaped lower end fitting loosely over a cylindrical projection on the plug 192. When the machine is idle the cup-shaped end of the rod 198 is yieldingly urged downwardly by means of a spring 199 (see FIG. 7) into engagement with the ball 196 to press it against the seat 194, closing the valve. When the spool valve 128 is raised to the position shown in FIG. 5 by downward movement of the treadle 12 the spring 199 is rendered ineffective to close the valve 190 against the flow of oil and the oil escapes into the compartment 148. With the valve 190 open oil from the high pressure relief valve 156 may raise the ball 196 and the rod 198, the cup-shaped portion of the rod uncovering ports 200 in the cylindrical projection of the plug 192 for passage of oil into the compartment 148. Opening the circuit through the micro-switch 22R by yielding movement of the abutments 18 and 20 when engaged by a shoe supported on the ram 6 causes the spring 199 to close the valve 190, as shown in FIG. 5, as will be later explained.

To allow a small proportion of oil pumped through the valve block 127 to bleed through the reduced pressure relief valve 190 when it is open there is formed in the plug 160 a by-pass 604. The by-pass permits a restricted flow even though the high pressure relief valve 156 is closed, so that pressure is built up in the passageway between the reduced pressure relief valve 190 and the high pressure relief valve 156. To provide communication between the passageway between the relief valves 190 and 156 and the under side of the piston 168, there are provided in the plug 160 peripheral ports 202, so that oil may seep slowly past the high pressure relief valve 156 to support the load of the piston 168, the reduced pressure valve 190 thus assuming control of the pressure.

The reduced pressure valve 190 may be set conveniently by manual adjustment of spring pressure on the rod 198 to open at a pressure in the region of 70 pounds per square inch. The pressure between the relief valves 190 and 156 is adequate to support the load of the piston 168 by reason of its increased area of contact as compared with the area of contact presented by the slide member 158. The ports 202 are comparatively small in diameter to prevent a sudden surge of oil on the under side of the piston 168 acting in a manner to set up undesirable vibration or impact.

From what has been said it will be appreciated that opening of the circuit through the switch 22R results from yielding movement of the abutments 18 and 20, causing the reduced pressure valve to become effective in reducing the maximum pressure by which a shoe is acted upon. When the machine is tripped by depression of the treadle 12 to raise the ram it is desirable to have a shoe supported on the pad 1 come into engagement with the abutments 18 and 20 as quickly as possible. To this end the maximum pressure necessary to overcome the inertia of the parts is regulated by the high pressure relief valve 156. At this stage in an operating cycle of the machine the safety control check valve 602 is in an open position to admit free passage of oil from the escape chamber 100 as the ram moves upwardly. To slow down the speed with which the pressure applying members are actuated at this time, and to prevent application of heavy pressure, according to the present invention the oil escaping from the chamber 100 returns to the sump 16 through the safety control check valve 602.

The safety control check valve 602 comprises a hollow plug 606 threaded into the valve block 127. Slidably mounted in the plug 606 is a tubular member 608 having an enlarged centrally disposed circular portion sliding loosely within an enlarged bore at the lower end of the plug 606. The enlarged circular portion of the tubular member 608 forms a piston 610 for a purpose to be explained. The tubular member 608 extends downwardly from one side of the piston 610 to fit closely within a counterbore portion of the passageway 218 and upwardly from the other side of the piston to project through the plug 606 into the upper compartment 148. Surrounding the upwardly extending portion of the tubular member 608 is a compression spring 612 for normally urging the tubular member 608 in a direction to cause its lower end to engage a step 614 in the passageway 218. When the valve 606 is in its open position with the tubular member urged into engagement with the step 614 the tubular member provides a continuation of the passageway 218 through which the oil from the chamber 100 may pass freely into the compartment 148.

Within the valve block 127 beneath the piston 610 is a chamber 616 communicating with a passageway between the valves 156 and 190. This passageway is indicated at 618 and connects the chamber 616 to the valve 190. When the reduced pressure relief valve 190 closes and pressure between the valves 156 and 190 builds up a corresponding pressure in the chamber 616. Prior to the opening of the high pressure relief valve 156 the pressure in the chamber 616 is sufficient to raise the piston 610 and the tubular member 608 against the resistance of the spring 612. When the piston 610 is raised it engages a stop provided by a step 620 in the bore of the plug 606. Whenever the step is engaged by the tubular member the check valve 602 is closed as in FIG. 5.

To adjust the check valve 602 there is alined with the bore in the tubular member 608 a rod 622 threaded into the upper part of the valve block 127. The rod 622, which constitutes a part of the check valve 602, extends downwardly from a cover part 623 of the compartment 148 and has its lower end beveled and positioned to close the upper end of the tubular member 608, restricting the flow of oil from the passageway 218 into the compartment 148. By suitable adjustment of the rod in the check valve 602 the volume of oil forced from the chamber 100 as the ram rises may be restricted to reduce the speed at which the gap between the shoe and the pressure members is closed after the check valve 602 is actuated.

It will thus be seen that by restricting escape of oil from the chamber 100 the speed of elevation of the ram 6 is reduced and the likelihood of injury to the hands of an operator is minimized, which injury may occur not only from excessive pressure but also if the initial momentum of the ram which is relatively heavy is too high. The possible maximum pressure which may be exerted on the ram is thus reduced by causing the relief valve 190 to take over control of the pressure in the system from the high pressure relief valve 156, protecting further the hands of the operator from likelihood of injury. The changeover of pressure control and speed of the ram may occur without temporarily halting elevation of the ram, thus reducing delay in the operating cycle of the machine. When the ram 6 comes to rest with a shoe gripped between the pad 1 and the abutments 18 and 20 under reduced pressure and the operator has ascertained that the shoe is correctly supported, he releases his hand hold on the shoe and the appropriate hand control 600R or L is actuated to cause increased pressure to be applied to the shoe. Upon actuation of the hand control the reduced pressure relief valve 190 is temporarily opened for the escape of oil in the passageway between the relief valves 190 and 156 and for the escape of the oil pressure acting against the under side of the piston 168. Thus, the pressure of the oil supply is again controlled entirely by the high pressure relief valve 156 to boost the pressure in the ram 6. Furthermore, opening of the reduced pressure valve 190 permits the oil pressure in the chamber 616 to be reduced so that the spring 612 may open the check valve 602, moving the tubular member 608 into engagement with the step 614. Oil forced from the chamber 616 escapes through the valve 190 into the compartment 148 through the passageway 618. Thus, oil flows freely through tubular member 608 and passageway 218 from the chamber 100 in the ram 6 and the shoe may be clamped under maximum available pressure as quickly as possible.

At the end of the "dwell" period the spool valve 128 automatically moves to its lowered position. The spool valve 128 has a portion 222 (see FIG. 5) of reduced diameter to provide an annular passage in the cylinder 130. When the spool valve is in its lowered closed position it enables communication between the ports 132 and the ports 224 to the closed upper end of a cylinder 226 in the block 127. Fitting the cylinder 226 is a piston 228 having a downward projection 230 at its lower end. When the spool valve 128 moves to its lowermost closed position oil from the pressure conduit 126 enters the upper end of the cylinder 226 through ports 132 and 224 to urge the piston 228 downwardly until the projection 230 engages and unseats the ball 140 in the nonreturn valve 136. Opening the valve 136 releases the pressure in the chamber 106 of the ram 6, so that springs 114 are enabled to draw the ram downwardly to its inoperative lowered position, oil in the filled chamber 106 being forced through the hollow piston rod 92 (see FIG. 4), conduit 104, valve 136, ports 134, ports 146 in the cylinder 130 and passageway 218 to the exhaust compartment 148. With the spool valve 128 in its lowered closed position the ports 134 again communicate with the ports 146, a portion of the oil from the filled chamber 106 entering the escape chamber 100 through the ports 146, annular channel 220, conduit 108, space 101 and ports 102. The remainder of the oil from the chamber 106 escapes through the passageway 218, the check valve 602 and the upper compartment 148 of the valve block.

In order to start the upward movement of the ram 6 the spool valve 128 is raised from its closed position to its open position of FIG. 5. For this purpose a bearing block is mounted on a cover portion 623 of the valve block 127 and rotatably supports a shaft 626 (see FIG. 6). The shaft 626 has projecting rearwardly from it an arm 624 fixed to the shaft and provided with a roll 628 arranged to engage the underside of a collar 238 on a vertical stem 240 projecting from the spool valve. Surrounding the stem 240 is a compression spring 242 disposed between the spool valve and the cover portion of the valve block 127. The spring 242 normally urges the spool valve downwardly toward its closed position.

Pivotally connected to the treadle 12 is the lower end of a treadle rod 630 (see FIGS. 6 and 7), the upper end of which is similarly connected to a forwardly extending arm of a lever 629 fixed to the shaft 626. Depression of the treadle swings the forwardly projecting arm of the lever downwardly to rotate the shaft 626 and swing the arm 624 upwardly. Upward movement of the arm 624 moves the roll 628 and the collar 238 in a direction to raise the spool valve 128 to its open position thereby starting operation of the ram 6.

To actuate the reduced pressure relief valve 190 the valve block 127 has mounted on it a pair of stub shafts 632 parallel to the shaft 626. The stub shafts 632 have rotatably mounted on them a bifurcated portion (see FIG. 6) of a lever 634 having a forward end 636 overlying the upper end of the rod 198 of the relief valve 190. Axially alined with the rod 198 is a second rod 258 (see FIG. 7) slidably mounted in the table 30 and urged by a spring 199 to bear on the forward end 636 of the lever 634, the lever 634 urging the rod 198 downwardly to close the relief valve 190. The rearward end of the lever 634 is pivotally connected to the armature of a pressure control solenoid 638 (see FIG. 6) which is energized to raise the forward end of the lever 634 and the rod 258 (FIG. 7), thereby rendering the spring 199 ineffective to close the reduced pressure relief valve 190. The reduced pressure relief valve is then rendered inoperative.

To initiate a predetermined operating cycle of the machine the treadle rod 630 has secured to it a cross bar 640 (FIG. 7) at a position to engage a normally closed switch 642 secured to the valve block 127. The switch 642 is arranged to be engaged by the cross bar 640 whenever the treadle 12 is released and the switch is connected into the electrical circuit of the solenoid 638. When the treadle is in raised position with the cross bar engaging the switch 642 the circuit to the solenoid 638 is held open. Depression of the treadle 12 to initiate an operating cycle of the machine raises the spool valve 128 to its open position and causes the cross bar 640 to descend, so that the switch 642 may close the circuit for the solenoid 638. Closing the solenoid circuit renders the reduced pressure relief valve 190 inoperative.

The electrical circuit of the machine includes the normally closed microswitch 22R arranged to be actuated to open its circuit by raising the lever 66 when a shoe on the pad box engages the abutments 18 and 20. Opening the switch 22R breaks the electrical circuit to the solenoid 638 so that the lever 634 swings in a direction to enable the reduced pressure relief valve 190 to open against the force of the spring 199, when a predetermined low pressure exists, thereupon causing the relief valve 190 to control the pressure in the hydraulic system. Should the operator release the treadle at this stage of the operation the arm 624 swings in a direction to move the spool valve 128 to its downward closed position, the ram then descending to its lowermost inoperative position and opening the gap for removal or readjustment of the shoe positioned on the pad.

It is apparent that when the ram 6 comes to rest with a shoe gripped and held between the pad box 2 and the abutments 18 and 20 under pressure controlled by the reduced pressure relief valve 190, the operator may then press the hand control 600R to cause the shoe to be subjected to maximum pressure controlled by the high pressure relief valve 156. The hand control 600R comprises a double pole double throw plunger type switch (see FIG. 13) which while pressed by the operator closes the circuit to the solenoid 638 to by-pass the valve, thus re-energizing the solenoid 638 and operating the lever 634 to render the reduced pressure relief valve 190 ineffective. Release of the hand control 600R breaks the circuit to de-energize the solenoid 638, closing the reduced pressure relief valve 190. At this time the pressure built up in the ram 6 while the hand control is actuated is maintained by the nonreturn valve 136.

Actuation of the hand control 600R (FIG. 1) causes the pressure on a shoe supported by the ram 6 to be boosted to the desired maximum and simultaneously starts the timing mechanism associated with the corresponding station to hold the shoe so clamped for a suitable time period. Supported on the cover portion 623 of the valve block 127 is a depending arm of a latch lever 646 (see FIG. 7). The lower arm of the latch lever 646 is connected to the plunger of a solenoid 270 secured to the machine frame. When the electrical circuit is completed to the solenoid 270 the latch lever 646 swings in a direction to close the contacts of a normally open switch 648 connected in circuit with the timing mechanism. The hand control 600R being a double throw double contact switch closes the circuit to the solenoid when actuated. The hand control 600R also breaks the circuit to the solenoid 270 to enable a spring 653 stretched between the lever 646 and a pin on the valve block 127 to urge the latch lever away from the normally open switch 648, thus enabling the circuit through the switch 648 to be closed and the timing mechanism to be started.

Another arm of the lever 646 has a projection 652 which is arranged to be urged by the spring 653 in a direction away from the switch 648 and toward a latch 654 (FIG. 7) on the rearwardly extending arm of the lever 629. When the projection 652 is engaged by the latch 654 the treadle is locked in starting position and the spool valve 128 is locked against closure so that the operator may remove his foot from the treadle 12 after the hand control 600R is pressed. This will give him an opportunity to apply a shoe to the other station of the machine.

The timing mechanism associated with both operating stations of the machine is of a conventional adjustable type and at the end of each "dwell" period the solenoid 270 is energized to swing the latch arm 646 in a direction to open the switch 648 and to move the projection 652 out of engagement with the latch 654 so that the spool valve 128 may descend to its closed position and the treadle 12 be released.

Figure 13:
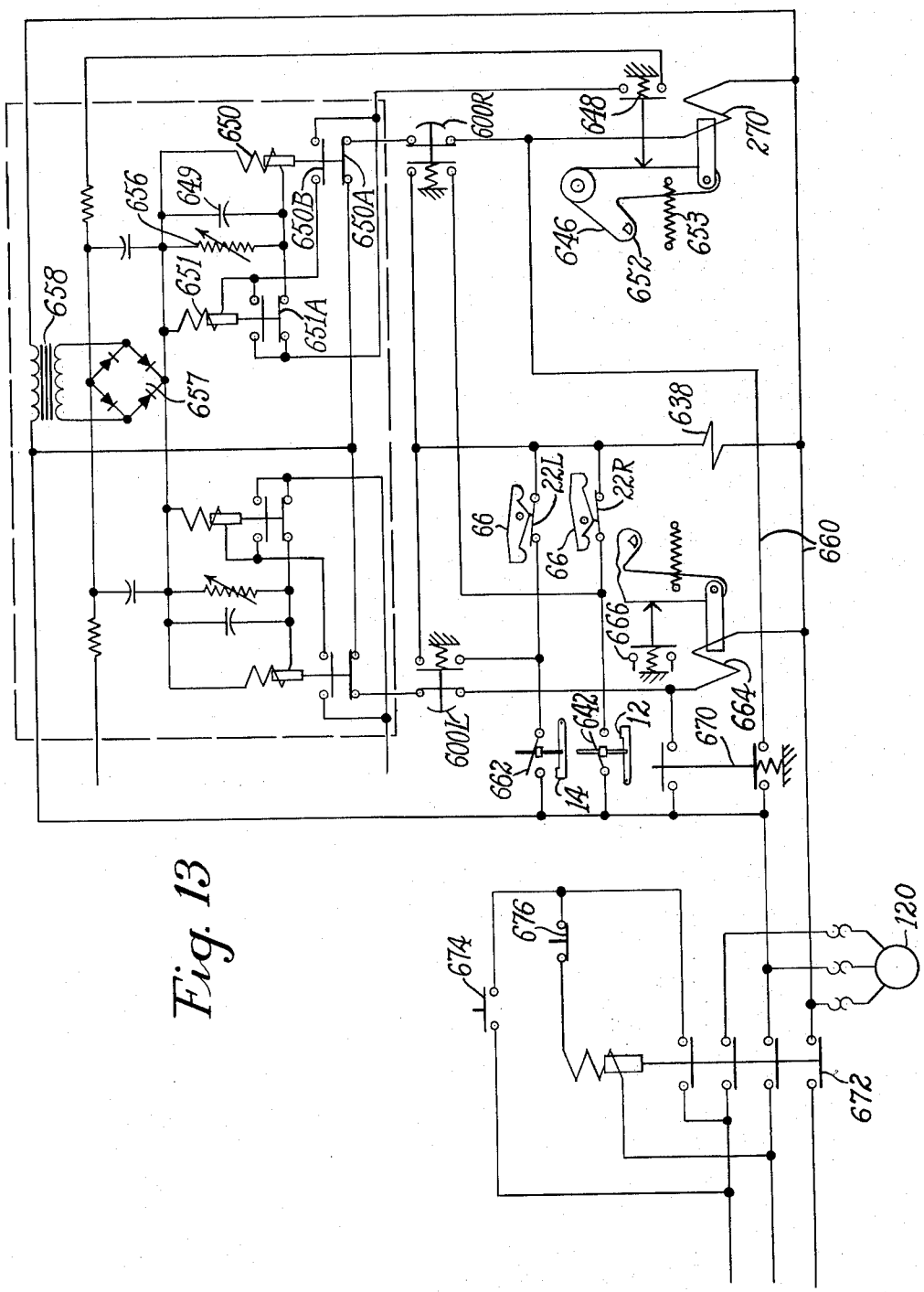
FIG. 13 is an electrical circuit diagram for the machine.

Referring more particularly to FIG. 13, when the operator actuates the manual switch 600R closing the circuit to the solenoid 638 through the switch 642, a condenser 649 is charged and a relay coil 650 is energized. Energization of the relay coil 650 causes contacts 650A to be opened and contacts 650B to be closed. Closing contacts 650B energizes a coil 651 of a relay to actuate double throw contacts 651A which act to break the supply circuit to the condenser 649 and close a holding circuit for the coil of relay 651. As soon as the charging circuit for the condenser 649 is opened the coil 650 continues to be energized by current flowing from the condenser, the condenser being shunted by a high variable resistance 656 to enable the time of discharge for the condenser to be changed. While the contacts 650A are held open the solenoid 270 is prevented from being energized. After the proper time interval the contacts 650A are again closed and the solenoid 270 re-energized.

For providing power to the relay coils the coils are connected to one side of a full wave rectifier 657 energized by a step down transformer 658 connected to an alternating current supply line 660. The left hand portion of the circuit is timed for actuation of its solenoid corresponding to the solenoid 270 on the right side in a similar manner.

The ram 8 is set in operation by depression of the treadle 14 in a manner similar to that described for operation of the ram 6. Depression of the treadle 14 through connections similar to those described in connection with the treadle 12 raises a spool valve 316 (see FIG. 5) from a closed to an open position. The connections actuated by the treadle 12 are mounted on the right side of the valve block 127 looking from the front of the machine and the connections actuated by the treadle 14 are mounted on the left side of the valve block.

Depressing the treadle 14 causes a switch 662 (see also FIG. 6) similar to the switch 642 to close and to energize the solenoid 638, thereby swinging the lever 634 in a direction to move the reduced pressure relief valve 190 to inoperative closed position after opening of a switch 22L at that station of the machine to de-energize the solenoid 638. Swinging the lever 634 in that direction causes the valve 190 to open under reduced pressure. Actuation of a hand control 600L associated with the ram 8 boosts the pressure on a shoe to a maximum, causes the solenoid 638 to be re-energized and the reduced pressure relief valve 190 to become ineffective. The high pressure relief valve 156 then takes over control of the pressure in the hydraulic system. Simultaneously with the taking over of control by the high pressure valve 156 a solenoid 664 similar to the left hand solenoid 270 connected to a latch lever similar to that indicated at 646, is de-energized, said similar latch lever causing the spool valve 316 to be secured in its raised open position and a switch 666 in circuit with the timing mechanism to be opened. Movement of the spool valve 316 to its closed position at the end of a "dwell" period causes a nonreturn valve 346 (FIG. 6) having a function similar to that of the valve 136 to be opened for escape of oil. The relief valves 156 and 190 are arranged in the hydraulic system to control pressure whichever ram is being operated. A check valve 668 similar to the check valve 602 restricts escape of oil from the ram 8 at the appropriate time.

The pads 1 and the pad boxes 2 and 4 are illustrated as being suitable for use with shoes having heel breast flaps formed integrally with their soles for attachment to the breasts of their heels. The pad boxes 2 and 4 are similar to the pad box disclosed in a prior application for United States Letters Patent, Serial No. 13,848 filed March 9, 1960 upon application of William A. Barker et al., wherein a heel supporting pad is arranged to engage the rear of a shoe heel as the flap is pressed against the breast of the heel. The heel pad identified in the prior application by the numeral 66 may be moved from an inoperative to an operative position before application of high pressure to the shoe. In the present machine provision is made for automatically moving heel supporting pads 350 (see FIG. 1) similar to the heel pad 66 in the prior application as the rams are raised.

Figure 3:
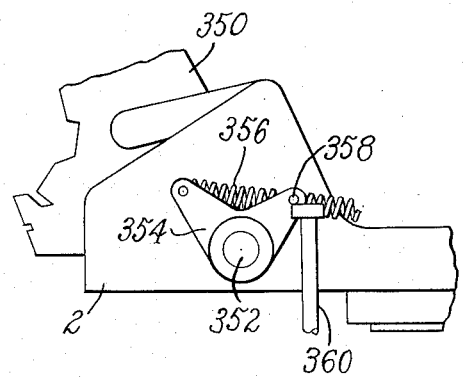
FIG. 3 is a fragmentary view of mechanism for actuating a portion of a pad box in the machine.

As shown in FIG. 3 the present pad box supports a pivot 352 on which a bell crank 354 is fixed. Anchored between one arm of the bell crank 354 and the pad box 2 is a spring 356 acting to urge the bell crank in a direction to cause the heel pad 350 to be urged into engagement with the rear surface of a shoe heel. With the ram 6 in its lowered position the heel pad 350 is prevented from being moved by a pin 358 fixed to the bell crank 354, which pin is engaged by a head on the upper end of a stem 360 secured to the table 30. Thus, the heel supporting pad is held in an inoperative position while the operator presents a shoe to the pad box 2. Elevation of the ram 6 carries the pin 358 away from engagement with the stem 360 so that the spring 356 may automatically swing the lever 354 and move the heel pad into operative position. Descent of the ram 6 at the end of a sole-attaching operation causes the pin 358 to engage the stem 360 and to swing the bell crank lever 354 in a direction automatically to cause movement of the heel pad 350 to its inoperative position, thus releasing the shoe. A similar arrangement is provided in connection with the pad box 4.

It will be appreciated that other work supports or pad boxes suitable for the type of shoe being operated upon and for the operation to be performed may be secured to the ram 6 and 8 in a sole molding operation, for instance, pad boxes having the required contours may be used together with mating pressure heads which replace the abutments 18 and 20. The carriers 38 which support the abutments 18 and 20 may easily be removed from the guide members 36 merely by unscrewing the lock screws 40 (FIG. 1).

In case of improper operation in the machine there is provided in the electrical system an emergency release switch 670 arranged for convenient actuation by the machine operator. When the switch 670 is actuated it closes circuits to both solenoids 270 and 664, disengaging the projection 652 from the latch 654 to release the treadle 12 and a similar projection and a similar latch to release the treadle 14, thus terminating the operating cycles of the machine under any conditions and releasing the shoes from pressure.

For convenience in providing a unified electrical system the supply line 660 consists of one phase in a three-phase circuit for the main driving motor 120. Connections for the other two phases pass through an electromagnetically controlled four-pole switch 672 connected with a starting button 674 and a stopping button 676 in a conventional manner.

Figure 8:
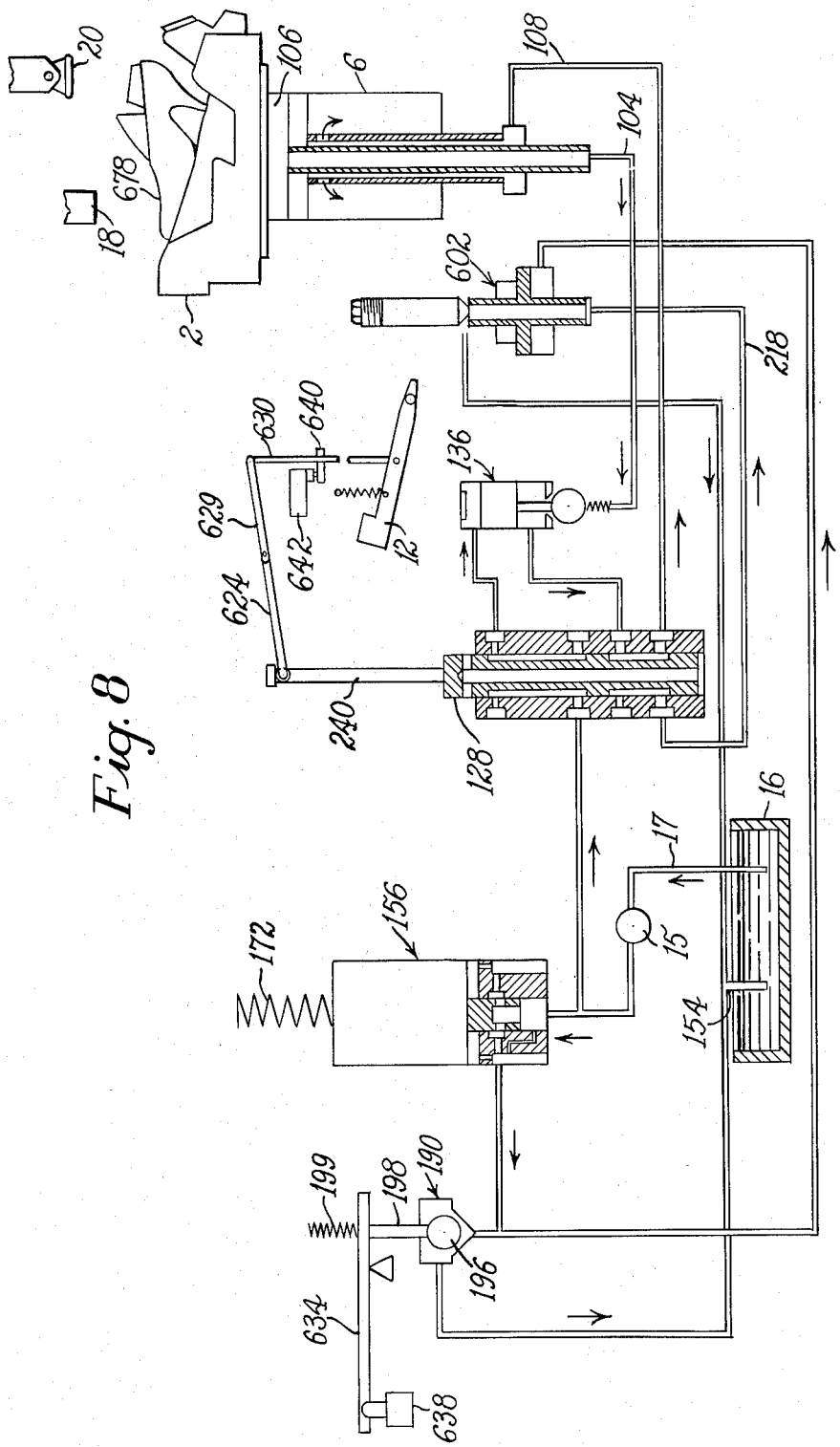
FIG. 8 is a hydraulic circuit diagram illustrating the condition of the hydraulic system while the machine is at rest or with one of the rams returning to its inoperative position.
Figure 9:
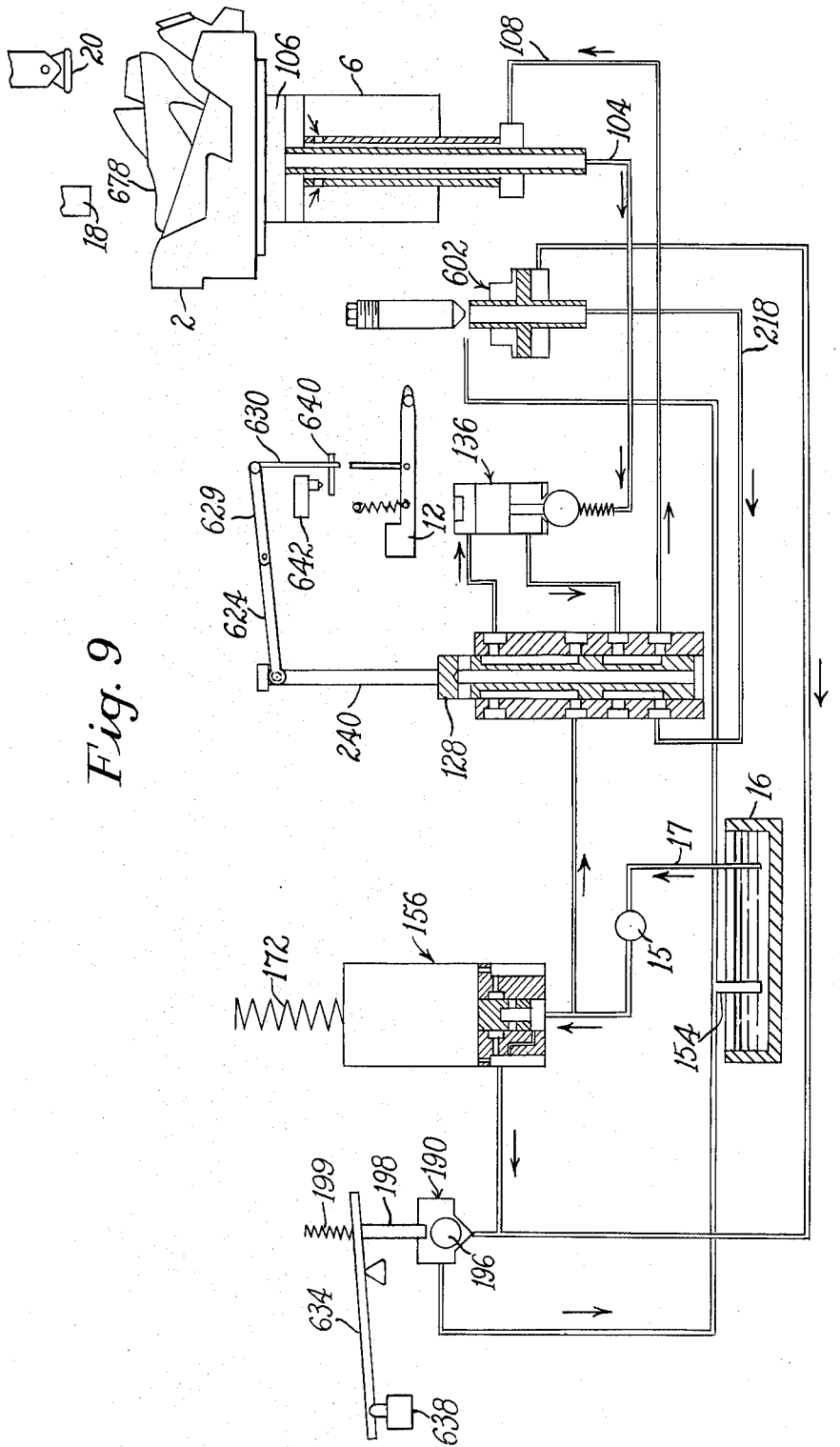
FIG. 9 is a similar circuit diagram illustrating the positions of the parts while the machine is at rest and with the starting treadle partially depressed.
Figure 10:
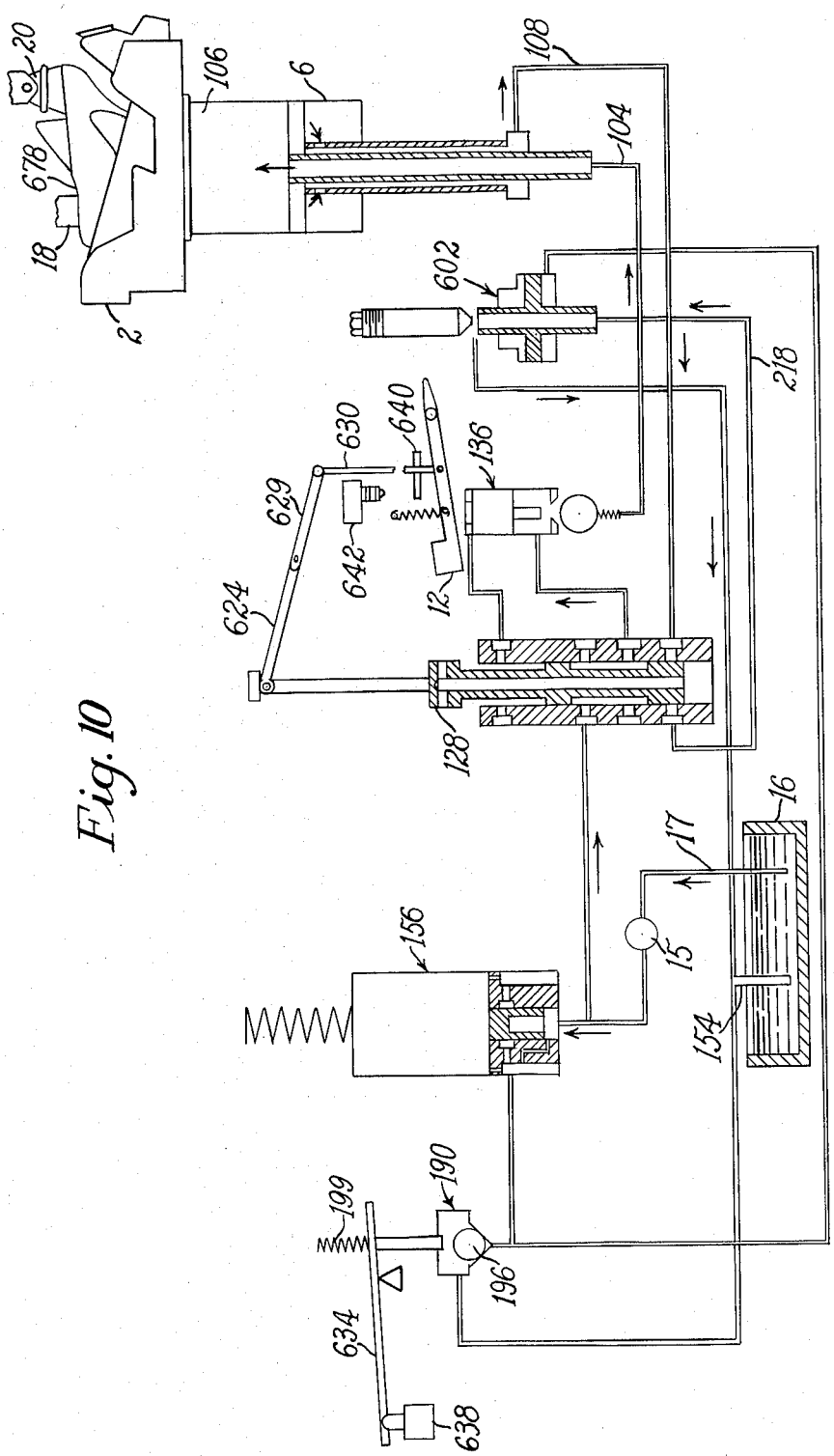
FIG. 10 is a similar diagram showing the positions of the parts during rapid rise of a ram with the treadle fully depressed.
Figure 11:
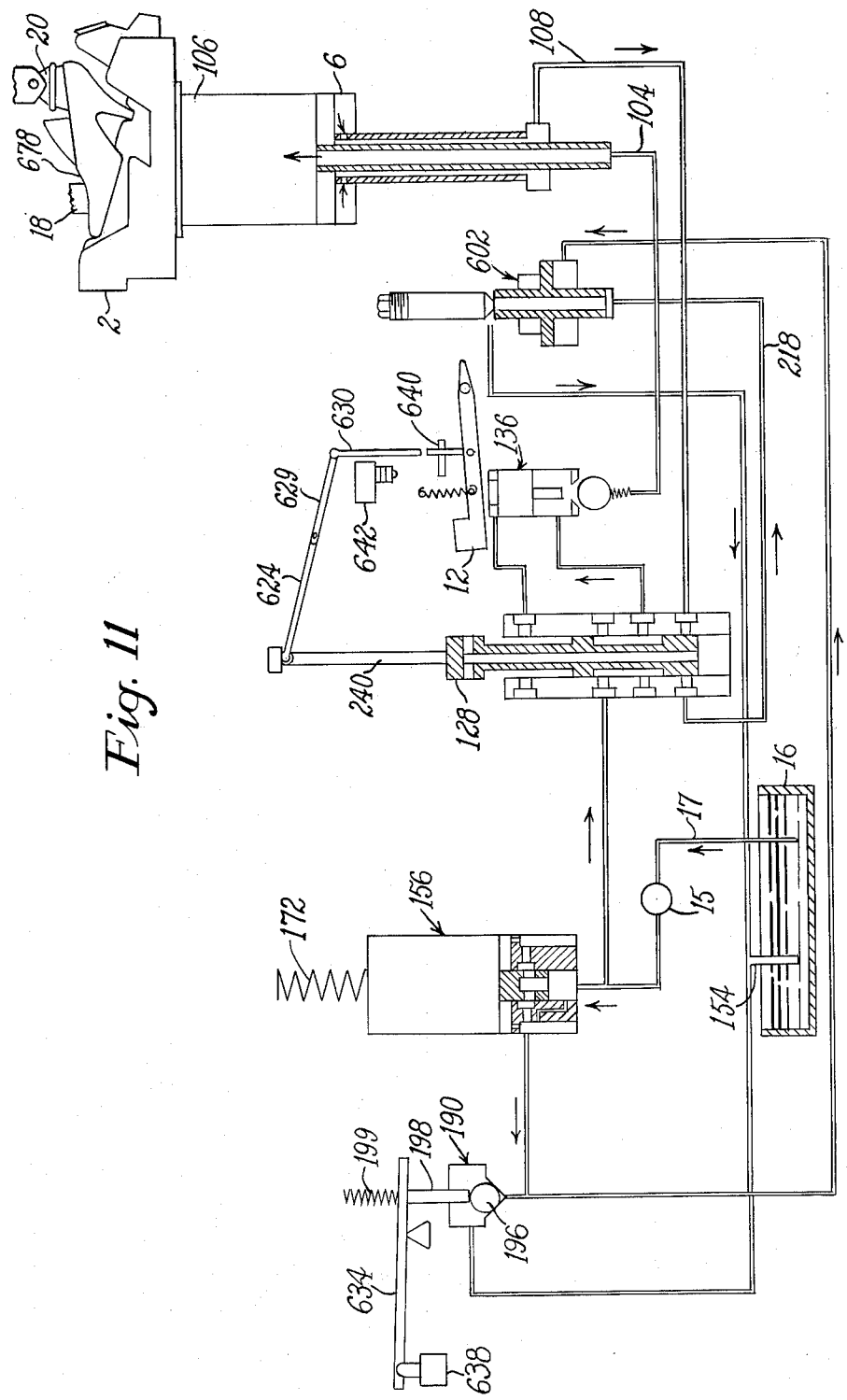
FIG. 11 is a similar diagram, illustrating the continued rise of a ram at reduced speed.
Figure 12:
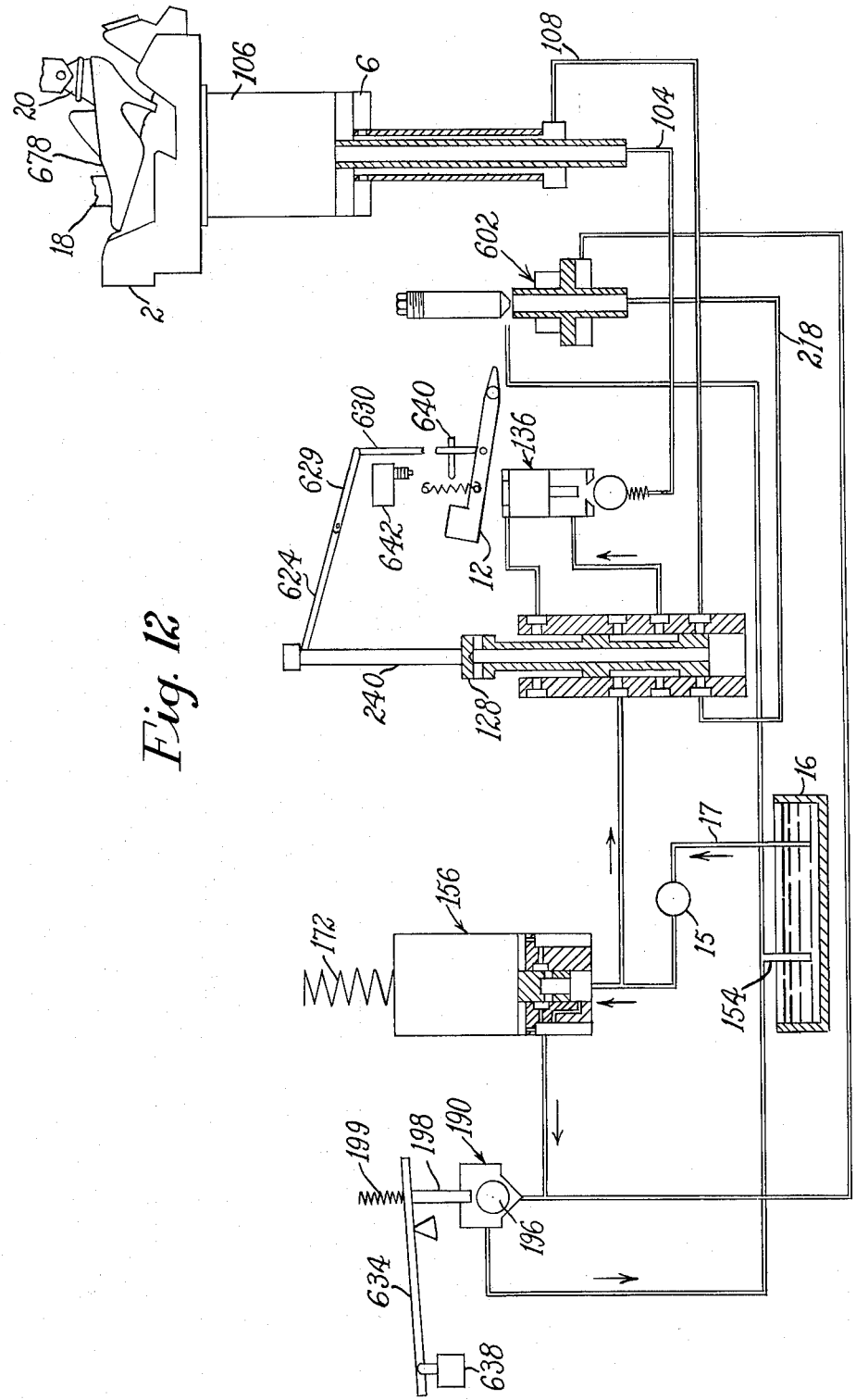
FIG. 12 is a similar diagram of the machine, illustrating the positions of the parts while high sole attaching pressure is being applied to the ram.

Briefly the operation of the hydraulic system is as follows: With the controls and ram 6 in the positions indicated in FIG. 8 the rams have returned to their lowermost positions. A shoe 678 may then be applied to the pad on the ram, the ram having returned to its lowermost position through the action of the springs 114 during which return oil passes from the chamber 106 to the piston rod 92, conduit 104, nonreturn valve 136, the spool valve 128, conduit 108 and back to the chamber 100 beneath the piston 90, any excess of oil running through passageway 218 and the check valve 602 to the reservoir 16. After the shoe has been applied to the pad on the ram the treadle 12 is depressed, as in FIG. 9 causing the switch 642 to close and the reduced pressure valve 190 to become inoperative. If the treadle 12 is held depressed the high pressure relief valve 156 assumes a displacement indicated in FIG. 12 and the ram rises to bring the shoe into contact with the abutments, as in FIG. 10. Full depression of the treadle 12, causes the ram to rise at a relatively high speed with high oil pressure which is available to overcome inertia of the parts quickly and to impart to the ram a high initial acceleration. At this time the check valve 602 is opened so as not to restrict the flow of oil. When the shoe touches the toe and heel abutments 18 and 20 the microswitch 22R in the head of the machine is actuated to energize the solenoid 638, thereby closing the reduced pressure relief valve 190, which in turn closes the check valve 602, restricting the flow of oil through the check valve, as illustrated in FIG. 11. Thus, the upward speed of the ram 6 is reduced and it rises more slowly under reduced pressure. The reduced pressure enables the inertia of the ram and its assembled parts to be dissipated, limiting the load on the heel abutment to less than 100 pounds. The limitation on the heel abutment pressure avoids injury to an operator's hand if it should be trapped between the heel abutment and the last in the shoe. Up to this point in an operating cycle the ram may be lowered merely by releasing the treadle 12.

Figure 7:
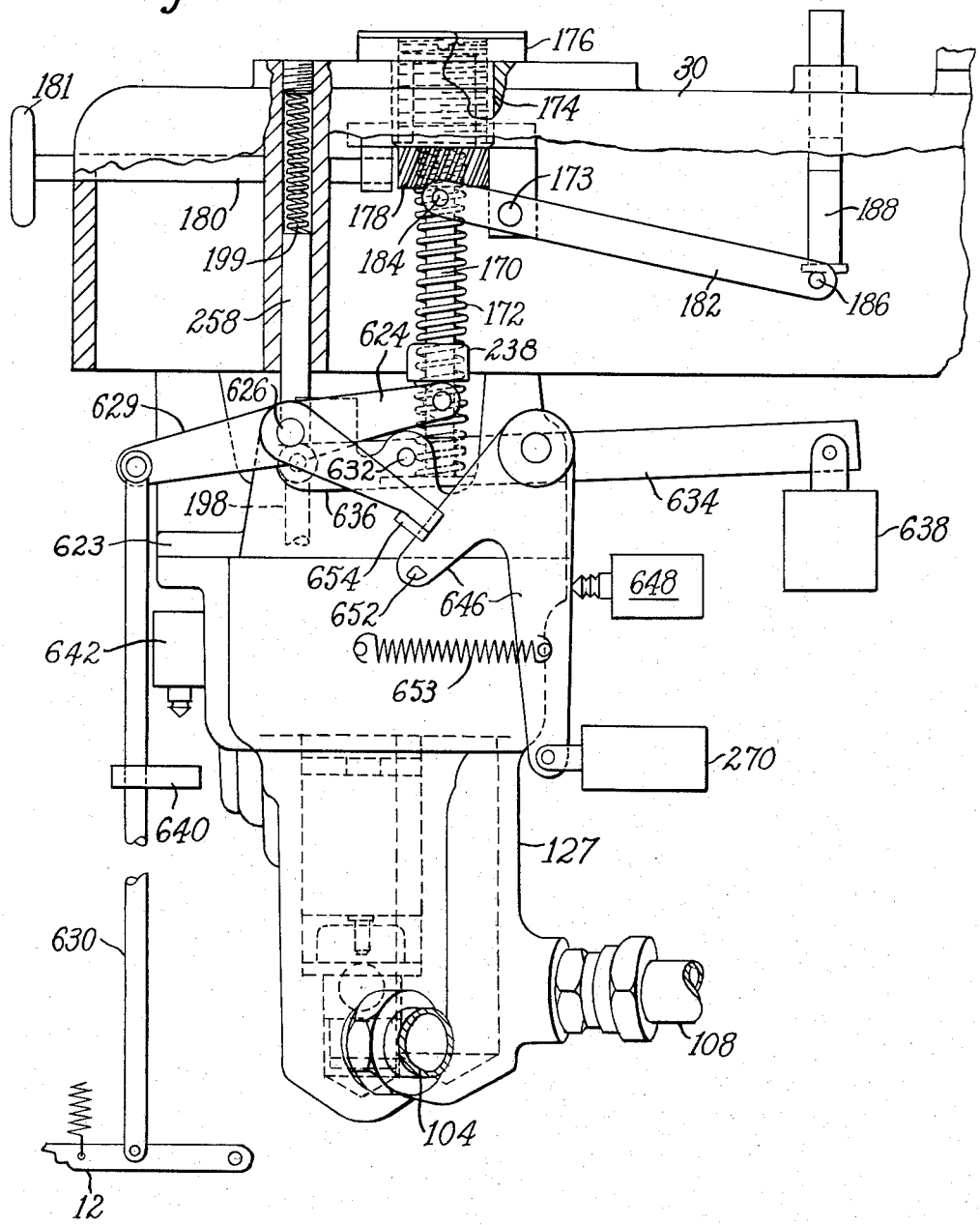
FIG. 7 is a right hand side view with parts broken away of another portion of the valve mechanism.

In order to continue the operating cycle of the machine on a shoe the operator while holding the treadle depressed must press the control switch 600R, causing high pressure oil to be supplied again to the ram and the check valve 602 to be opened. At the same time the electrical timer is started, limiting the period of the high pressure portion in the operating cycle. With the hydraulic parts of the machine in the positions of FIG. 12 the operating cycle continues under the control of the timer with the ram 6 locked in raised position to the end of the period. At the end of the time period the treadle is unlatched and released by the solenoid 270 acting on the lever 646 as shown in FIG. 7. The ram then descends under the action of the springs 114 for unloading the pad box and replacement of the processed shoe with a new one. After release of the treadle the oil flows in the directions indicated in FIG. 8. The ram 8 at the other station of the machine operates with a similarly controlled cycle.

The nature and scope of the invention having been indicated and a particular embodiment having been described, what is claimed is:

1. A machine for applying pressure to shoe bottoms having fluid pressure applying members providing between them a separating gap to enable an operator freedom in presenting a shoe to the machine, having:

(a) a hydraulic system actuated through a predetermined cycle, first to close up the separating gap quickly between the shoe pressure members, then to apply a relatively low pressure, and thereafter to apply a heavy working pressure to the shoe, (b) a treadle for starting the hydraulic cycle, and (c) means acting to halt the hydraulic cycle just before heavy pressure is exerted on the shoe, in combination with (d) a safety control for slowing down to the speed with which the pressure applying members are actuated before applying heavy pressure to the shoe to prevent the hands of the operator while presenting the shoe to the machine from being subject to impact between the pressure applying members.

2. A machine for applying pressure to shoe bottoms having fluid pressure applying members providing between them a separating gap to enable an operator freedom in presenting a shoe to the machine, having:

(a) a hydraulic system actuated through a predetermined cycle, first to close up the separating gap quickly between the shoe pressure members, then to apply a relatively low pressure, and thereafter to apply a heavy working pressure to the shoe, (b) a treadle for starting the hydraulic cycle, and (c) means acting to halt the hydraulic cycle just before heavy pressure is exerted on the shoe, in combination with (d) a safety control for slowing down the speed with which the pressure applying members are actuated before applying heavy pressure to the shoe to prevent the hands of the operator while presenting the shoe to the machine from being subject to impact between the pressure applying members, and (e) a hand actuated control to exert increased pressure between the pressure applying members after closing the gap.

3. A machine for applying pressure to shoe bottoms having fluid pressure applying members providing between them a separating gap to enable an operator freedom in presenting a shoe to the machine, having:

(a) a hydraulic system actuated through a predetermined cycle, first to close up the separating gap quickly between the shoe pressure members, then to apply a relatively low pressure, and thereafter to apply a heavy working pressure to the shoe, (b) a treadle for starting the hydraulic cycle, and (c) means acting to halt the hydraulic cycle just before heavy pressure is exerted on the shoe, in combination with (d) a safety control for slowing down the speed with which the pressure applying members are actuated before applying heavy pressure to the shoe to prevent the hands of the operator while presenting the shoe to the machine from being subject to impact between the pressure applying members, and (e) timing mechanism, the operation of which is initiated by the safety control to extend for a predetermined period of time the increased pressure on the shoe between the pressure applying members.

4. A machine for applying pressure to shoe bottoms, having:

(a) a pad box, (b) a pressure head spaced from the pad box with a separating gap to enable an operator freedom in presenting a shoe to the machine, and (c) a hydraulic system comprising a piston and cylinder constructed with an oil chamber at either side of the piston and acting through a predetermined cycle to close up and open the gap but to halt the cycle with the shoe held between the pressure head and the pad box, (d) one of which chambers is filled to apply pressure to a shoe between the pressure head and the pad box and from the other of which oil escapes while pressure is being applied to the shoe, in combination with (e) safety controls in the hydraulic system including a nonreturn valve to prevent relief of pressure from the filled chamber in the cylinder after the cycle is halted.

5. A machine for applying pressure to shoe bottoms, having:

(a) a pad box, (b) a pressure head spaced from the pad box with a separating gap to enable an operator freedom in presenting a shoe to the machine, and (c) a hydraulic system comprising a piston and cylinder constructed with an oil chamber at either side of the piston and acting through a predetermined cycle to close up and open the gap but to halt the cycle with the shoe held between the pressure head and the pad box, (d) one of which chambers is filled to apply pressure to a shoe between the pressure head and the pad box and from the other of which oil escapes while pressure is being applied to the shoe, in combination with (e) safety controls in the hydraulic system including a nonreturn valve to prevent relief of pressure from the filled chamber in the cylinder after the cycle is halted, and (f) a check valve for restricting the flow of oil from the escape chamber to reduce the speed at which the gap between the pad box and the pressure head is being closed when the safety control is actuated.

6. A machine for applying pressure to shoe bottoms, having:

(a) a pad box, (b) a pressure head spaced from the pad box with a separating gap to enable an operator freedom in presenting a shoe to the machine, and (c) a hydraulic system comprising a piston and cylinder constructed with an oil chamber at either side of the piston and acting through a predetermined cycle to close up and open the gap but to halt the cycle with the shoe held between the pressure head and the pad box, (d) one of which chambers is filled to apply pressure to a shoe between the pressure head and the pad box and from the other of which oil escapes while pressure is being applied to the shoe, in combination with (e) safety controls in the hydraulic system including a nonreturn valve to prevent relief of pressure from the filled chamber in the cylinder after the cycle is halted, (f) a check valve for restricting the flow of oil from the escape chamber to reduce the speed at which the gap between the pad box and the pressure head is being closed when the safety control is actuated, and (g) a high pressure relief valve for limiting the pressure applied to the piston in the filled chamber of the cylinder.

7. A machine for applying pressure to shoe bottoms, having:

(a) a pad box, (b) a pressure head spaced from the pad box with a separating gap to enable an operator freedom in presenting a shoe to the machine, and (c) a hydraulic system comprising a piston and cylinder constructed with an oil chamber at either side of the piston and acting through a predetermined cycle to close up and open the gap but to halt the cycle with the shoe held between the pressure head and the pad box, (d) one of which chambers is filled to apply pressure to a shoe between the pressure head and the pad box and from the other of which oil escapes while pressure is being applied to the shoe, in combination with:

(e) safety controls in the hydraulic system including a nonreturn valve to prevent relief of pressure from the filled chamber in the cylinder after the cycle is halted, (f) a check valve for restricting the flow of oil from the escape chamber to reduce the speed at which the gap between the pad box and the pressure head is being closed when the safety control is actuated, (g) a high pressure relief valve for limiting the pressure applied to the piston in the filled chamber of the cylinder, and (h) a reduced pressure relief valve to control the pressure in the cylinder while the separating gap is being closed up.

8. A machine for applying pressure to shoe bottoms, having:

(a) a pad box, (b) a pressure head spaced from the pad box with a separating gap to enable an operator freedom in presenting a shoe to the machine, and (c) a hydraulic system comprising a piston and cylinder constructed with an oil chamber at either side of the piston and acting through a predetermined cycle to close up and open the gap but to halt the cycle with the shoe held betwene the pressure head and the pad box, (d) one of which chambers is filled to apply pressure to a shoe between the pressure head and the pad box and from the other of which oil escapes while pressure is being applied to the shoe, in combination with (e) safety controls in the hydraulic system including a nonreturn valve to prevent relief of pressure from the filled chamber in the cylinder, (f) a check valve for restricting the flow of oil from the escape chamber to reduce the speed at which the gap between the pad box and the pressure head is being closed when the safety control is actuated, (g) a high pressure relief valve for limiting the pressure applied to the piston in the filled chamber of the cylinder, (h) a reduced pressure relief valve to control the pressure in the cylinder while the separating gap is being closed up, and (i) means actuated by pressure on the pressure head as the separating gap is being closed to render ineffective the reduced pressure relief valve and to cause the high pressure relief valve to become effective in applying increased pressure to a shoe on the pad box.

9. A machine for applying pressure to shoe bottoms having:

(a) a pad box and (b) a pressure head spaced from the pad box with a separating gap to enable an operator freedom in presenting a shoe to the machine, and (c) a hydraulic system comprising a piston and cylinder constructed with an oil chamber at either side of the piston, (d) one of which chambers is filled to supply pressure to a shoe between the pressure head and the pad box and (e) from the other of which oil escapes while the piston is closing up the gap, in combination with (f) a safety control check valve for restricting the flow of oil from the escape chamber while the gap is being closed up to reduce the speed of movement as the shoe approaches the pressure head.

10. A machine for applying pressure to shoe bottoms, having:

(a) a pad box, (b) a pressure head spaced from the pad box with a separating gap to enable an operator freedom in presenting a shoe to the machine, and (c) a hydraulic system comprising a piston and cylinder constructed with an oil chamber at either side of the piston and acting through a predetermined cycle to close up and open the gap but to halt the cycle with the shoe held between the pressure head and the pad box (d) one of which chambers is filled to apply pressure to a shoe between the pressure head and the pad box and from the other of which oil escapes while pressure is being applied to the shoe, in combination with (e) safety controls in the hydraulic system including a nonreturn valve to prevent relief of pressure from the filled chamber in the cylinder after the cycle is halted, (f) a check valve for restricting the flow of oil from the escape chamber to reduce the speed at which the gap between the pad box and the pressure head is being closed when the safety control is actuated, (g) the safety controls in the hydraulic system also preventing release of pressure from the filled chamber throughout the time the shoe is being acted upon.

11. A machine for applying pressure to shoe bottoms, having:

(a) a pad box, (b) a pressure head spaced from the pad box with a separating gap to enable an operator freedom in presenting a shoe to the machine, and (c) a hydraulic system comprising a piston and cylinder constructed with an oil chamber at either side of the piston, and acting through a predetermined cycle to close up and open the gap but to halt the cycle with the shoe held between the pressure head and the pad box.

(d) one of which chambers is filled to apply pressure to a shoe between the pressure head and the pad box and from the other of which oil escapes while pressure is being applied to the shoe, in combination with (e) safety controls in the hydraulic system including a nonreturn valve to prevent relief of pressure from the filled chamber in the cylinder after the cycle is halted, (f) a check valve for restricting the flow of oil from the escape chamber to reduce the speed at which the gap between the pad box and the pressure head is being closed when the safety control is actuated, (g) the safety controls in the hydraulic system also preventing release of pressure from the filled chamber throughout the time the shoe is being acted upon, and (h) a high pressure relief valve for limiting the force applied by the piston to the shoe after the gap is closed.

12. A machine for applying pressure to shoe bottoms, having:

(a) a pad box, (b) a pressure head spaced from the pad box with a separating gap to enable an operator freedom in presenting a shoe to the machine, and (c) a hydraulic system comprising a piston and cylinder constructed with an oil chamber at either side of the piston, and acting through a predetermined cycle to close up and open the gap but to halt the cycle with the shoe held between the pressure head and the pad box, (d) one of which chambers is filled to apply pressure to a shoe between the pressure head and the pad box and from the other of which oil escapes while pressure is being applied to the shoe, in combination with (e) safety controls in the hydraulic system including a nonreturn valve to prevent relief of pressure from the filled chamber in the cylinder after the cycle is halted, (f) a check valve for restricting the flow of oil from the escape chamber to reduce the speed at which the gap between the pad box and the pressure head is being closed when the safety control is actuated, (g) the safety controls in the hydraulic system also preventing release of pressure from the filled chamber throughout the time the shoe is being acted upon, (h) a high pressure relief valve for limiting the force applied by the piston to the shoe after the gap is closed, and (i) a reduced pressure relief valve connected to the hydraulic system to prevent application of high pressure to the shoe as the shoe is being gripped between the pad box and the pressure head.

13. A machine for applying pressure to shoe bottoms, having:

(a) a pad box, (b) a pressure head spaced from the pad box with a separating gap to enable an operator freedom in presenting a shoe to the machine, and (c) a hydraulic system comprising a piston and cylinder constructed with an oil chamber at either side of the piston and acting through a predetermined cycle to close up and open the gap but to halt the cycle with the shoe held between the pressure head and the pad box, (d) one of which chambers is filled to apply pressure to a shoe between the pressure head and the pad box and from the other of which oil escapes while pressure is being applied to the shoe, in combination with (e) safety controls in the hydraulic system including a nonreturn valve to prevent relief of pressure from the filled chamber in the cylinder after the cycle is halted, (f) a hand actuated control for opening the nonreturn valve to relieve the pressure built up in the escape chamber, and (g) a high pressure relief valve for limiting the increased pressure applied to the shoe after the gap is closed.

14. A machine for applying pressure to shoe bottoms, having:

(a) a pad box, (b) a pressure head spaced from the pad box with a separating gap to enable an operator freedom in presenting a shoe to the machine, and (c) a hydraulic system comprising a piston and cylinder constructed with an oil chamber at either side of the piston and acting through a predetermined cycle to close up and open the gap but to halt the cycle with the shoe held between the pressure head and the pad box, (d) one of which chambers is filled to apply pressure to a shoe between the pressure head and the pad box and from the other of which oil escapes while pressure is being applied to the shoe, in combination with (e) safety controls in the hydraulic system including a nonreturn valve to prevent relief of pressure from the filled chamber in the cylinder after the cycle is halted, (f) a hand actuated control for opening the nonreturn valve to relieve the pressure built up in the escape chamber, (g) a high pressure relief valve for limiting the increased pressure applied to the shoe after the gap is closed, and (h) a reduced pressure relief valve connected to the hydraulic system to prevent application of high pressure to the shoe as the shoe is being gripped between the pad box and the pressure head.

15. A machine for applying pressure to shoe bottoms, having fluid pressure applying members providing between them a separating gap to enable an operator freedom in presenting a shoe to the machine, having:

(a) a hydraulic system actuated through a predetermined cycle, to close up the separating gap quickly between the shoe pressure members, first to apply a relatively low pressure to a shoe and thereafter to apply a heavy working pressure to the shoe, (b) a treadle for starting the hydraulic cycle, and (c) means acting to halt the hydraulic cycle just before heavy pressure is exerted on the shoe, in combination with (d) a safety control for slowing down the speed with which the pressure applying members are actuated before applying heavy pressure to the shoe to prevent the hands of the operator while presenting the shoe to the machine from being subject to impact between the pressure applying members, (e) a hand actuated control to exert increased pressure between the pressure applying members after closing the gap, (f) a latch for locking the treadle against release after the hand control has been actuated to hold the treadle in starting position, and (g) an electromagnet energized by the hand control to release the treadle latch.

References Cited in the file of this patent

UNITED STATES PATENTS

| | | |
|---|---|---|
| 2,694,818 | Cantley | Nov. 23, 1954 |
| 2,877,474 | Glickman | Mar. 17, 1959 |